3,028,258
METHOD OF PRODUCING A HIGH FINISH ON PAPER PRODUCTS
John C. Rice, Tenafly, N.J., assignor to Lowe Paper Company, Ridgefield, N.J., a corporation of New Jersey
No Drawing. Filed Mar. 27, 1956, Ser. No. 574,090
16 Claims. (Cl. 117—64)

This invention relates to the production of smooth, high gloss paper and paper products such as boxboard. This application is a continuation-in-part of applications Serial No. 295,553, filed June 25, 1952, and Serial No. 362,952, filed June 19, 1953, both now abandoned.

It has long been a problem in the production of coated paper and paper products to provide a paper of extremely high gloss, smooth finish, which is flexible and printable. The prior art products leave much to be desired as to one or more of these characteristics.

It has now been found that an extremely high gloss, smooth finish, flexible, printable paper product can be produced by coating paper or a paper product with a coating composition containing a high clay content and a thermoplastic resinous component, drying and brushing the coated product and then molding the coated product against a smooth polished surface. It is also advantageous to have a non-thermoplastic adhesive incorporated in the coating composition. The thermoplastic resinous component may comprise a so-called elastomer or a plastomer, or a combination of elastomer and plastomer providing that when it is incorporated in the coating composition, said composition has the necessary roll molding characteristics more fully described below.

The coating compositions of the present invention possess the unique property of moldability under conditions of temperature and pressure without discoloring, becoming mottled, sticking or producing other adverse reactions, thereby overcoming the long standing problem of "grimming" encountered with conventional formulations when subjected to the high pressures of finishing operations. "Grimming" wherein the coating composition turns cloudy, dark and has a mottled appearance if subjected to high pressures after drying, has been the greatest stumbling block in the obtention of the desired high gloss and smooth finish on paper products. Moreover, the coating composition of this invention makes it possible for the first time to produce readily printable, extremely high gloss papers and paper products which have good folding characteristics. This is a result long sought in the art.

A feature of the present invention is the use of a coating composition high in fine clay and/or other pigment content as compared with prior art coating compositions. The clay of the instant coating composition, and/or other pigment, constitutes 70% or more of the coating composition. The high clay content of the present coating composition accounts for the printability of the paper or paper products coated with said composition. As used herein the term pigment includes the clays, as well as such other materials as titanium dioxide, zinc sulfide, calcium carbonate, etc., and mixtures of clays with said materials.

Clays suitable in the compounding of the present paper coating compositions are of the kaolinite type, and are of a fine particle size, more specifically at least 85% of its particles being less than two microns in size. In a preferred form of this invention 100% of the particles are below 2 microns in size. White pigments such as titanium dioxide, zinc sulfide, calcium carbonate, etc., may be substituted for all or a part of the clay in order to improve the opacity and brightness of the finished paper provided at least 85% of the particles are less than two microns in size. The titanium dioxide most commonly used is a standard grade of pigment having a dry brightness of 95–98.5 as measured by the Hunter multi-purpose reflectometer, and a particle size of 0.3–0.4 micron.

A desirable feature of the present invention is the inclusion of a non-thermoplastic adhesive in the coating composition. These adhesives include protein type adhesives among which are casein, gelatin, soyabean, protein, etc.; vegetable adhesives, including the carbohydrate adhesives, such as starch, gum arabic, pectins, plant gums, agar-agar and cellulose derivatives; and synthetic adhesives such as polyvinyl alcohol, carboxymethyl cellulose, methyl cellulose and polydiisocyanates and their condensation products with polyhydric alcohols, diamines or diacids.

The purpose of the adhesive is to bind the pigments to the paper web and simultaneously reduce the tendency of the coating to stick to the polished surface in the finishing process. Absence of the adhesive may cause sticking of the coating to the roll. Because of this non-sticking quality, the adhesive is a desirable ingredient of the coating composition.

Still another feature of the present invention is the inclusion in the coating composition of a thermoplastic resinous component, having elastomeric and plastomeric properties which may comprise one or more resins. The elastomeric properties of the thermoplastic component used in the present invention account primarily for the flexible character of the coated product made by this invention while the plastomeric properties in general, render the coating composition moldable. It must be understood that many thermoplastic resins have both plastomeric and elastomeric properties, and that there is no sharp line of distinction between these properties.

The thermoplastic resins which exhibit primarily elastomeric properties, may be described as rubbery polymers. This includes rubbery homopolymers and copolymers such as the homopolymers and copolymers of butadiene; isoprene-isobutylene copolymers and isoprene. More particularly the rubbery polymers useful in the present invention include, but are not restricted to, butadiene-styrene copolymer known as GR-S or Buna S; butadiene acrylonitrile copolymer known as GR-N or Buna N; butadiene isobutylene copolymer; or isoprene isobutylene copolymer known as GR-I or butyl rubber; and polyisoprene which is natural rubber. Elastomeric acrylic polymers may also be utilized in lieu of the rubbers.

The thermoplastic resins which exhibit primarily plastomeric properties include homopolymeric and copolymeric resins. More specifically they include vinyl polymers such as polyvinyl chloride, polyvinyl acetate, styrene resins, cellulose and cellulose derivatives such as ethyl cellulose or cellulose acetate, ethyl methacrylate, butyl methacrylate-acrylonitrile copolymers, copolymers of vinyl acetate and vinyl stearate, polyesters (glycol adipates), diglycol sebacates, ethylol propane succinates, and glycol itaconates or their co-condensation mixtures.

Those thermoplastic resins possessing the combined requisite elastomeric and plastomeric properties include polyacrylates and copolymers of polyacrylates, polyvinyl butyral, polyvinyl butyl ether, cellulose acetate-butyrate, polyester poly-urethane, cellulose tri-acetate, vinyl acetate, maleic anhydride ester copolymers, styrene-maleic anhydride, polyvinyl butyrate-acetate copolymer, polyvinyl cumarones, polyvinyl carbazols, vinylidene chloride and copolymers thereof.

The thermoplastic resinous component is preferably used in latex form, namely microscopic particles of polymer suspended in a water vehicle by the aid of emulsifying and/or stabilizing agents. Typical emulsifying agents are alkali or alkaline earth laurates, oleates, or stearates, quaternary ammonium compounds, sulphonated alcohols, sulphonated mineral oils, and proteins. The latices are preferably maintained in a stable condition by the addition of an alkali such as ammonium hydroxide in quantities sufficient to obtain a pH of about 8–10, to which a stabilizing agent such as casein or other proteinaceous material is added.

It is also advantageous to incorporate in the present coating composition, a wax, preferably a mineral wax. The wax additionally acts to prevent the coating composition from adhering to the rolls during the molding operation and facilitates the brushing operation more fully described below.

The respective amounts of the various ingredients used in the coating composition of this invention will vary with the particular adhesive, if any, and the nature of thermoplastic resin component. In Table I below is outlined the range of amounts of the respective ingredients that may be used in the coating composition of this invention:

TABLE I

[Based on 100 parts of clay and/or pigment]

| | Operative Range, parts | Preferred Range, parts |
|---|---|---|
| Adhesive | 0–12 | 3–8 |
| Thermoplastic resin component | 10–40 | 12–15 |

As noted above, it will be understood that the thermoplastic resin component having the elastomeric and plastomeric properties may constitute a single resin or a combination of resins. Where the thermoplastic resin is a mixture of an elastomer and plastomer the respective amounts of the plastomer and elastomer will depend on the nature of the particular ingredient selected. A very hard, high softening plastomer will require more elastomer to produce the desired flexibility. A relatively soft plastomer may require little or no elastomer. Similarly, the presence of a very soft elastomer requires the addition of more plastomer and a fairly hard elastomer may obviate the addition of the plastomer. When a combination of resins is employed, a range of about 10 to 15 parts of plastomer and 15 to 25 parts of elastomer per 100 parts of clay and/or pigment are used.

The coating composition of the present invention may be prepared by any conventional mixing method. When an adhesive, for example casein is used, it is dissolved with a suitable solvent such as an aqueous alkali solution. The dissolved aqueous casein solution is added to a slurry of clay and water. The aqueous dispersion of thermoplastic resin component is added to the clay slurry with adequate agitation to ensure a homogeneous admixture thereof. The following examples are additionally illustrative of the present coating compositions and are not to be construed as limiting the scope thereof. All specified amounts are parts by weight unless otherwise indicated.

*Example I*

3 parts of casein are dissolved with .75 part borax in 35 parts of water. This casein solution is added to an aqueous clay slurry containing 70 parts kaolin clay, wherein 90% of the particles are below 2 microns in size and 30 parts titanium dioxide. To this casein-clay slurry is added 15 parts (dry weight) of polybutyl methacrylate latex with sufficient agitation to form a homogenous mixture.

*Example II*

8 parts of casein are dissolved with an alkaline substance, such as borax or ammonium hydroxide, in water. This casein solution is added to an aqueous clay slurry containing 80 parts clay and 20 parts titanium dioxide, the total amount of water being 120 parts. To this casein-clay slurry, 12 parts (dry weight) polybutyl methacrylate latex are added with sufficient agitation to form a homogenous mixture.

*Example III*

8 parts casein are dissolved with an alkaline substance (borax) in water. This casein solution is added to an aqueous clay slurry containing 80 parts of clay and 20 parts of titanium dioxide, the total amount of water being 120 parts. To this casein-clay slurry, 6 parts (dry weight) butadiene-styrene copolymer latex and 6 parts (dry weight) polyvinyl chloride are added with sufficient agitation to form a homogenous mixture.

*Example IV*

5 parts of gelatin are dissolved in 45 parts of water. This gelatin solution is added to an aqueous solution containing 70 parts kaolin clay wherein 100% of the particles are below 2 microns, and 30 parts of titanium dioxide. To this gelatin-clay slurry are added 5 parts polyethyl methacrylate (dry weight) and 25 parts butadiene-styrene copolymer (dry weight) with sufficient agitation to form a homogenous mixture.

In place of the gelatin in Example IV, soyabean protein may be used. Also in place of polyethyl methacrylate the following plastomers may be used: butyl methacrylate-acrylonitrile or polyvinyl acetate.

*Example V*

8 parts of starch are dissolved in 25 parts of water. This starch solution is added to an aqueous solution containing 70 parts kaolin clay wherein 100% of the particles are below 2 microns and 30 parts titanium dioxide. To this starch-clay solution are added 5 parts polyvinyl butyral latex (dry weight) and 10 parts polybutadiene-acrylonitrile (dry weight) latex with sufficient agitation to form a homogenous mixture.

In place of starch, soybean protein, carboxymethylcellulose, polyvinyl alcohol or casein may be used in Example V. In place of polyvinyl butyral, polyethyl methacrylate, polybutyl methacrylate, polyhexyl methacrylate may be used. In place of polybutadiene-acrylonitrile, polybutadiene-styrene, polybutadiene-isoprene, polybutadiene-isobutylene or butyl rubber may be used.

*Example VI*

10 parts of casein is dissolved in 70 parts of water. This casein solution is added to an aqueous solution containing 60 parts of kaolin clay wherein 95% of the particles are below 2 microns in size, and 40 parts of calcium carbonate. To this casein-clay slurry are added 5 parts ethyl methacrylate (dry weight) and 5 parts polybutadiene styrene (dry weight) with sufficient agitation to form a homogenous mixture.

In place of the casein the following adhesives may be used in Example VI: soybean protein, starch, polyvinyl alcohol. In place of the calcium carbonate, zinc sulfide or magnesium carbonate may be used. In place of polyethyl methacrylate, polyvinyl chloride, polyvinyl butyral or polyvinyl acetate may be used, and in place of polybutadiene styrene, butyl rubber or polyisobutylene may be used.

Example VII

To an aqueous solution containing 70 parts kaolin wherein 100% of the particles are below 2 microns and 30 parts titanium dioxide was added 20 parts ethyl acrylate (dry weight) with sufficient agitation to form a homogenous mixture.

Example VIII 3 parts of casein are dissolved with .75 part borax in 35 parts of water. This casein solution is added to an aqueous clay slurry containing 70 parts kaolin clay, wherein 90% of the particles are below 2 microns in size and 30 parts titanium dioxide. To this casein-clay slurry is added 12 parts ethyl acrylate and 3 parts paraffin wax with sufficient agitation to form a homogenous mixture.

Example IX

| | |
|---|---|
| Kaolin clay | 75 parts. |
| Titanium dioxide | 25 parts. |
| Butadiene styrene acrylonitrile | 6.0 (added as 40% latex). |
| Butyl methacrylate | 7.0 (added as 40% latex). |
| Casein | 6.0 (added as 13% sol.). |
| Ultramarine blue | 0.2. |
| Water | Gal. 10.0. |

Example X

| | Parts |
|---|---|
| Kaolin clay (100% below 2 microns) | 70 |
| Titanium dioxide | 30 |
| Butyl methacrylate | 15 |
| Casein | 5 |
| Paraffin wax | 5 |
| Water | 150 |

The above examples indicate the extremely high proportion of non-thermoplastic materials used in my formulations. It will be recognized by those skilled in the art that the obtention of a moldable coating from such inflexible compositions is unique and unexpected.

Any conventional means of applying the coating composition to the surface of the sheet of paper such as spraying, brushing, dipping, rolling, etc., may be utilized in order to produce a uniform and effective coating thereon. This coated paper is then dried by conventional means. Festoon drying at about 130° F. is a specific method employed herein, although temperatures as high as 300° F. are also satisfactory, provided the finished moisture content of the coated paper is in the range of 5-12%.

One form of the present invention comprises using two coatings of the coating composition of this invention prior to the finishing operation. In this procedure a first light coat is applied and dried to a moisture content of 5-10% based on the total weight of paper and coating. A second light or medium heavy coating is then applied and the paper is again dried to a moisture content of 5-10% based on the total weight of paper and coating. This is then molded as described below. The advantages of the above-described two-coat procedure is that a better bond of the coating composition to the paper results and there is less chance of splitting. Furthermore, the double coated surface is smoother and more readily molded.

The dried coated paper product is then subjected to a brushing operation, which comprises moving the paper product past a series of high speed revolving soft brushes. The brushing operation partially brings out the gloss in the coating. More particularly, the coated and dried paper web is passed under a series of cylindrical brushes which rotate against the surface, using a bar in back of the paper web for support. The brushes are approximately 12 inches in diameter and rotate within a speed range of 750-1500 r.p.m., with a paper speed of between 150 and 1000 f.p.m. Normally, the paper speed is 300 f.p.m.

The brush bristles used are approximately 1½" in length and are made of Tampico fiber. The brushes may be rotated in either direction: i.e. opposite the paper web or with the paper web.

Seven brushes are usually employed in the machine; however, any number of brushes from a minimum of two may be used, depending upon the speed of the paper web. It is also possible to change the type of fiber used in the brush bristle to other materials such as China bristle or nylon. However, Tampico works best for the present coatings.

A moistening spray of water just prior to brushing is used to facilitate the finishing operation. A row of nozzles, made by Sprayco, spaced about 6" apart is employed, each of which ejects a fan shaped stream of atomized water on the surface of the paper about 18" before the first brush. In this way the water serves as a plasticizer to soften and lubricate the coating so that a higher finish is obtainable.

The thermoplastic resinous component in the coating and the fine particle clay provide the softness that is necessary to obtain the high finish in this process. The paraffin wax serves as a lubricant to prevent dusting and scratching of the coating.

Under the above conditions the gloss obtained with the coating composition of Example VIII runs between 90 and 100 using the 75° Gardner Gloss Meter, and between 20 and 40 on the 20° Gardner Gloss Meter. Before brushing, these values would be about 40-50 and 0-10 respectively.

The coated, dried, and brushed paper is subsequently subjected to a finishing operation which consists essentially of molding the coated web against a polished metal surface with a resilient backing to maintain contact. For any given coating composition, the pressure, temperature and time of contact can be regulated to produce the desired finish. When these conditions are regulated as described herein, the coating conforms to the polished metal surface, and when released forms a true replica of the latter.

The molding temperature required for the coating compositions employed to give them the necessary flow characteristics will vary with the particular resin or combinations of resins employed. However, the required temperature can be related to a well known physical characteristic that such resins have in general, known as the second order transition temperature. (See Advances in Colloid Science by Mark and Whitny, vol. II, Interscience Publishing Co., 1946, beginning at page 2. See also an article by Wiley in Industrial and Engineering Chemistry, 34, 1052-1056, 1952.)

The second order transition temperature of an amorphous thermoplastic resinous material is best determined by measuring density thereof as a function of temperature. An abrupt change in the slope of the density vs. temperature curve defines a second order transition point. The second order transition temperature is the temperature at which this occurs.

In the present invention, the molding temperature employed is within the range between 5° F. to 35° F. above the second order transition temperature. At this temperature there is a plastic flow which ceases at the moment the application of pressure is stopped. This is to be contrasted with fluid flow where the material is mobile under atmospheric or low pressures. Since this process is characterized by plastic flow, it is essentially a flow in solid or semi-solid state and as a rule much higher pressures are employed than are employed in conventional calendering operations. However, where one of the resins employed has a rather low softening point, or may be deformed with particular ease comparably low pressures of the order of 1,000 lbs. per linear inch or even 500 lbs. per linear inch may be employed. The unit, lbs. per linear inch, is more fully described below.

It is essential that during the molding process the coated web and the polished metal surface move at identical speeds. The pressure on the paper web must be sufficient to maintain intimate contact between the coated and the molding surface. Pressure temperature and time of contact are related so that it is possible to reduce pressure as the temperature of the molding surface is increased. After flow has been induced by the proper combination of temperature and pressure, the coated web must remain in contact with the molding surface for a short time to permit the coated surface to become annealed and oriented to the surface of the roll. An extremely high finish is obtainable by using a highly polished chrome plated metal surface.

The molding process of the present invention is performed with coating of a plastic nature capable of flowing when pressure and temperatures are applied, and hardening when pressure is released. It should be emphasized that during the whole process the coating is neither dried nor polymerized nor cast nor treated for any other purpose than to shape the surface by pressing against the molding surface. Consequently, it is apparent that this process is distinct from any known casting process wherein a solution, or thin fluid, is brought into contact with a surface whereon the fluid is solidified either by evaporation, freezing or polymerization. The essential features of casting, namely the mobility of the casting material applied and the absence of applied pressure during the subsequent setting process, clearly and unequivocally distinguish casting methods over the instant process, wherein the essential characteristics of the coating compositions are their non-mobility in the air dried state at room temperature, but their inherent pressure plastic property which makes it possible to conform to a molding surface at elevated temperatures.

It is conventional in this art to speak of calender pressures in terms of weight loading/linear inch. This is defined as the pounds of pressure applied on the journals of the cooperating rolls divided by the length of contact between the faces of the rolls, and is usually expressed in pounds/inch. Since the breadth of the nip increases as the applied pressure is increased, the pressure per unit area does not have a straight line relationship to the pressure/linear inch. The average nip width is approximately ½" when operating under a pressure of 2,000#/linear inch. Therefore, the pressure expressed in pounds per square inch in this case would be 4,000# sq. inch. The nip width will vary from approximately ¼" at 700# linear inch pressure to ⅝" at 3,000# in the operation of this invention.

One finishing method consists of a chrome plated metal drum or roller backed by a flat rolling web such as a drier felt or metal belt under sufficient tension to exert pressure against the back of the paper web. The roll should be equipped with temperature control between 100° and 300° F. The paper is then fed between the backing web and the polished drum so that the speeds of the paper and the drum surface are identical, and the paper web is stripped from the drum after rotating approximately 270° around its circumference. In this method the pressure employed is in the neighborhood of 20–100# per linear inch.

Another arrangement is to pass the paper between two cooperating rollers, one of which is highly polished and chromium plated, and a resilient backing roll, capable of exerting pressure in the order of 500–3000# per linear inch. The temperature of the metal roll must be capable of regulation between 70° and 500° F. One or both rolls may be driven. The essential feature is that the coated paper surface adheres sufficiently well to the polished metal roll so that there is no speed differential between them during the process.

The pressure used in this type of rolling mill will depend upon the coating formulation, type of base stock, temperature, and moisture content of the board. An example of the relationship between pressure and temperature at various contact times with the metal roll are recorded in the table below:

PRESSURE-TEMPERATURE-TIME-GLOSS RATING (20° GARDNER) RELATIONSHIP USING COATING COMPOSITION OF EXAMPLE VIII

500#/LINEAR INCH PRESSURE

| Contact Time | 180° F. | 200° F. | 240° F. | 280° F. |
|---|---|---|---|---|
| 1 second | 48 | 51 | 57 | 62 |
| 2 seconds | 53 | 55 | 60 | 63 |
| 3 seconds | 57 | 58 | 61 | 64 |

1,000#/LINEAR INCH PRESSURE

| 1 second | 52 | 57 | 65 | 75 |
|---|---|---|---|---|
| 2 seconds | 61 | 65 | 71 | 77 |
| 3 seconds | 66 | 69 | 74 | 79 |

2,000#/LINEAR INCH PRESSURE

| 1 second | 59 | 64 | 73 | 82 |
|---|---|---|---|---|
| 2 seconds | 66 | 70 | 77 | 84 |
| 3 seconds | 72 | 75 | 80 | 86 |

As an example, boxboard base stock requires pressure of about 2,000#/linear inch at a temperature of 250° F. Smoother base stocks will require less pressure or lower temperature. Increasing the moisture content of the board or paper improves the gloss. For example, an increase of 20–25° in gloss as measured by the Gardner 20° Gloss Meter is made by increasing the moisture content from 8% to 12%. After leaving the molding nip, the coating and paper follow the arc of the molding roll for 180° C., which provides about 1 second contact for orientation of the surface, required for the coating composition of Example II. However, this time of contact will vary for different formulations and will be dependent upon the thickness of the coating layer, heat capacities of, and heat transfer constants between, the paper, the metal roll, pressure and temperature.

It is essential, in the proper operation of this finishing procedure, to maintain a temperature in the rolling mill below the tack point of the thermoplastic component present in the coating composition. Consequently, the flow necessary to spread the coating in intimate contact over the roll surface is accomplished by applying the pressure in the nip whereby the material is made to flow plastically under pressure below a temperature at which it would be sufficiently fluid to carry out a casting operation, and therefore may be termed a "roll molding" process. By this operation, in which there must be no difference in speed between any of the metal rollers and the paper surface, the present process is distinguished from ordinary super-calendering wherein the finish is obtained by deliberately inducing a slippage between the metal rolls and the paper surface.

Another alternative finishing method comprises the use of multiple rolls, i.e. alternating metal and resilient backing rolls similar to the arrangement in a calender used in the paper and textile industry. Each of the metal rolls can be highly polished steel or chromium plated. The paper web is fed through the series of nips formed by these rolls from the top down, so that the face of the paper is in contact with the metal rolls. The coating is, therefore, molded in a series of steps and the maximum pressure is obtained at the last nip. The web is carried around for 270° of arc on the bottom metal roll, before being stripped from it and rewound. As noted above, this procedure makes it possible to employ lower temperatures and pressures at each of the pairs of rolls and still achieve the same high degree of gloss. The effect of each pair of rolls on the coated paper is cumulative and since the total time of contact between the metal surface and coated surface is longer when multiple rolls are employed, lower temperatures and pressures may be employed at each pair of rolls without sacrificing the high gloss of the product.

An important function of the elastomeric property of my composition is to act also as a tack regulator. While the tack is reduced by the addition of adhesive, as described above, to an extent which prevents sticking, the elastomeric property of the resin component renders the composition sufficiently tacky to prevent slip against the polished metal roll. In this way, the essential elements of a molding process are preserved and those of the far less efficient friction glazing are prevented. The amount of tack introduced by the elastomeric property of the resin component is sufficient even to overcome the lubricating action of small amounts of wax, if such an addition should be desirable.

The beneficial property imparted to the paper coating as a result of its submission to high pressures is its improved bending quality. A theoretical explanation for this enhanced bending quality is the orientation of the resinous molecules which produces a two-dimensionally stretched film of greater tensile strength. Bending quality is an extremely important factor in most cases, particularly in the boxboard industry. Paper products coated with the compositions described herein and finished by the process described are capable of being folded back on themselves and creased without cracking the coating.

The printing properties of paper or paperboard coated with the compositions and processes as described herein are superior to existing products. For example, the ink absorbency is neither too high nor too low, which provides maximum ink gloss, scuff resistance, and mileage, while at the same time producing uniform ink coverage.

The ink absorbency can be measured by the Dr. Case ink test using material made by the K & N Laboratories. It is possible to obtain a numerical expression of ink penetration by applying K & N ink to a small area of the paper for two minutes and then wiping dry. The Photovolt brightness search unit is then set at 100 on the unstained are and the brightness recorded on the stained area. The difference between this brightness reading and 100 is the absorbency rating for the surface. In this way, more absorbent surfaces will show higher ink readings.

The table below indicates comparative values of K & N ink ratings on various other prior art coatings and the coatings of the present invention. It should be noted that some type of coatings have such low K & N values that the ink does not penetrate the surface, and consequently cannot develop a satisfactory bond and is extremely slow drying. On the other extreme, high K & N values indicate a coating which is too absorbent, and which drains the ink vehicle excessively. This causes lower ink gloss, and poor smudge resistance due to the deficiency of ink vehicle.

The gloss of the product made under the present invention is outstandingly higher than all prior art products. This can be measured by the Gardner 20° Gloss-Meter and these values are listed in the table below. It should be noted that buffing enhances the gloss appreciably.

COMPARISON OF PRODUCTS MADE BY THE INSTANT PROCESS AND OTHER PRIOR ART PRODUCTS

| | Std. Friction Supercalender with Conventional Clay Coating | Clay Coating With Resin Topcoat | Cast Coating | Std. Friction Supercalender with Coating Formulation Herein Descr. | Roll Molded Finish With Formulation of Example I |
|---|---|---|---|---|---|
| Brightness (Photovolt) | 80 | 78 | 80 | 82 | 81 |
| Gloss (Gardner 20°) (Non-buffed) | 10 | 30 | 25 | 15 | 60 |
| Buffed Gloss (Gard. 20°) | | | | 30 | 75 |
| K & N Ink Rating | 40 | 2 | 50 | 35 | 20 |

*Example XI*

The composition of Example IX was applied to the surface of a standard grade of paper board, dried to a moisture content of about 8% and finished by passing through a rolling mill at 220° F. and 2,000# linear inch pressure, with or without buffing. This produces a gloss of 60 without buffing and 75 with buffing as measured by the Gardner 20° gloss meter.

*Example XII*

The composition of Example IX was applied to the surface of a standard grade of folding boxboard, dried to a moisture content of between 5% and 10% based on the total weight of paper and coating composition, and finished by brushing and passing it through a rolling mill as described above, at a temperature of about 270° F. and about 1,000 pounds per linear inch pressure.

A comparison of the finished coated stock qualities of Example XII with standard supercalender finished clay coated stock is as follows:

| | Standard Friction Supercalender with Conventional Clay Coating | Rolling Molded Finish with coating Formulation of Example XII |
|---|---|---|
| Brightness | 80 (Photovolt Inst.) | 80 |
| Gloss (20° Gardner) | 20 | 70 |
| K & N Ink Rating | 40 | 8–10 |

In another form of the invention, the coating composition may be constituted as follows:

BASED ON 100 PARTS OF CLAY AND/OR PIGMENT

| | Parts |
|---|---|
| Elastomer | 15–25 |
| Plastomer | 10–15 |
| Adhesive | 5–8 |

The elastomers, plastomers and adhesive used in this composition are of the same nature as those described above with respect to other forms of this invention. The method of coating and molding is also substantially as described, however, in this form of the invention, the roll molding is effected by pressing the coated paper through a rolling mill at relatively high pressure of the order of 1–3 tons per linear inch.

While the invention has been described with reference to specific embodiments, it will be apparent to those skilled in the art that various modifications may be made and equivalents substituted therefor, without departing from the principles and true nature of the present invention.

What is claimed is:

1. A method of producing high gloss, smooth finish, flexible and printable paper which comprises coating said paper with an aqueous coating composition containing at least 70% dry pigment, 85% of whose particles are below two microns in size, and containing a thermoplastic resin component, said coating composition when dried being capable of plastic flow when pressure and temperature are applied and hardening when pressure is released, drying said coated paper to a moisture content of from about 5% to 12% based on the total weight of paper and molding said dried coating while in solid or semi-solid state against a smooth surface at a molding temperature within the range of 5° F. to 35° F. above the second order transition temperature of the thermoplastic resin employed and at sufficient pressure to cause plastic flow in solid or semi-solid state of said coating, said temperature and pressure being maintained for a sufficient time to give said coated paper a high gloss smooth finish, said coated paper being subjected to a polishing operation subsequent to said drying step.

2. A method according to claim 1 wherein said coating composition consists of at least four ingredients and comprising essentially pigment; an elastomer selected from the class consisting of rubbery copolymers of butadiene, isoprene isobutylene copolymers and isoprene; a plastomeric material selected from the class consisting of thermoplastic non-rubber resinous vinyl homopolymers and acrylic homopolymers, styrene resins and cellulose; and an adhesive selected from the class consisting of casein, albumin, soya protein and starch; and the molding pressure is maintained at about 1 to 3 tons per linear inch.

3. A process according to claim 2 wherein said coating composition contains 15–25% by weight of the pigment of an elastomer selected from the class consisting of rubbery copolymers of butadiene, isoprene isobutylene copolymers and isoprene; 10 to 15% by weight of the pigment of a plastomer selected from the class consisting of thermoplastic non-rubber resinous vinyl homopolymers and acrylic homopolymers, styrene resin and cellulose and 5–8% by weight of the pigment of a material selected from the class consisting of casein, albumin, soya protein and starch.

4. A method according to claim 1, wherein said thermoplastic resin component is present within the range of from 10 to 40 parts per 100 parts of said pigment.

5. A process according to claim 4, wherein said coating composition includes a non-thermoplastic adhesive.

6. A process according to claim 5, wherein the coating composition contains thermoplastic resin component in an amount within the range of 12 to 15 parts per 100 parts of said material, and non-thermoplastic adhesive in an amount within the range of 3 to 8 parts per 100 parts of said material.

7. A process according to claim 1, wherein the thermoplastic resin component comprises a mixture of resins exhibiting elastomeric and plastomeric properties.

8. A process according to claim 1, wherein the paper is dried to a moisture content of 12% before molding.

9. A process according to claim 1, wherein the paper is dried to a moisture content of 5–10% based on the total weight of the paper, a second coat of said coating composition applied, and then again drying the coated paper to a moisture content of from 5–10% based on the total weight of the paper prior to molding the coating.

10. A process according to claim 1, wherein the coating is molded at a pressure between 20 pounds and 3000 pounds per linear inch and at elevated temperatures, the temperature employed being dependent upon the pressure employed, higher temperatures being used in the lower pressure ranges and lower temperatures being used in the higher pressure ranges.

11. A process according to claim 10, wherein the coating is molded between rollers at a pressure of from 20 to 100 pounds per linear inch.

12. A process according to claim 10, wherein the coating is molded between a pair of cooperating rollers one of which is highly polished and the other a resilient backing roll at a pressure of the order of 1000–3000 pounds per linear inch.

13. The method of producing a high gloss, smooth finish, flexible and printable paper product which comprises coating said paper with a coating composition having a content of at least 70% pigment at least 85% of whose particles are below 2 microns in size, said coating composition having also incorporated therein a thermoplastic resin component of from 10 to 40 parts by weight per 100 parts by weight of said pigment, drying said coated paper to a moisture content of approximately from 5% to 12%, subjecting said dried, coated paper to high speed brushing and molding said composition against a highly polished metal surface by subjecting said composition to pressure against said surface at a temperature of between 5° to 35° F. above the second order transition point of said thermoplastic resin component, whereby plastic flow of the coating is brought about, releasing the pressure, and maintaining contact of the coated paper against said highly polished surface until the coating composition has become annealed and has oriented itself against the said surface, and stripping said coated product from said surface.

14. A method according to claim 13, wherein a non-thermoplastic adhesive is incorporated in the coating composition.

15. A method according to claim 14, wherein said thermoplastic resin component is present in an amount within the range of 12 to 15 parts per 100 parts of said pigment and said non-thermoplastic adhesive is present in an amount within the range of from 3 to 8 parts per 100 parts of said pigment.

16. A method according to claim 13, wherein a mineral wax is incorporated in said coating composition.

References Cited in the file of this patent

UNITED STATES PATENTS

| | | |
|---|---|---|
| 1,583,788 | Gilman | May 11, 1926 |
| 2,111,058 | Winkelmann | Mar. 15, 1938 |
| 2,119,509 | Bardhart | June 7, 1938 |
| 2,158,987 | Maloney | May 16, 1939 |
| 2,349,153 | Ferrante | May 16, 1944 |
| 2,349,704 | Clark | May 23, 1944 |
| 2,395,992 | Clark | Mar. 5, 1946 |
| 2,537,114 | Young et al. | Jan. 9, 1951 |
| 2,597,087 | Cowgill | May 20, 1952 |
| 2,697,669 | Masterman | Dec. 21, 1954 |
| 2,725,307 | Sooy et al. | Nov. 29, 1955 |